United States Patent Office 3,037,971
Patented June 5, 1962

3,037,971
PROCESS FOR THE POLYMERIZATION OF OLEFINS WITH A METHYL TITANIUM TRIHALIDE CATALYST
Claus Beermann and Herbert Bestian, Frankfurt am Main, Germany, assignors, by mesne assignments, to Hercules Powder Company Incorporated, Wilmington, Del., a corporation of Delaware
No Drawing. Filed Mar. 28, 1960, Ser. No. 17,764
Claims priority, application Germany Dec. 16, 1955
5 Claims. (Cl. 260—93.7)

This invention relates to the polymerization of olefins and more particularly ethylene. More particularly it relates to the process in which a methyltitanium trihalide is the catalyst for the reaction.

It is known that ethylene polymerizes under high pressures, such as 2000 atm. to form solid products. However, the apparatus necessary for this purpose is difficult to construct and it is therefore desirable from the technical point of view to use apparatus of simpler construction.

It is further known from Belgian Patents 533,362, 534,792 and 534,888 that ethylene can be polymerized at atmospheric or slightly elevated pressures by using a two-component catalyst mixture. The catalyst mixture consists of, for example, an organoaluminum compound and a salt of Ti, Zr, Hf, V, Nb, Cr, Mo, W, Th and U.

It has now been found that olefins can be polymerized at atmospheric or slightly elevated pressures, up to about 150 atmospheres gage pressure, and suitably at temperatures to 100° C. but broadly in the range of 0° to 300° C., preferably at 0° C. to 100° C. in the presence of a dispersing medium by employing a methyltitanium trihalide as a polymerization catalyst. Exemplary of such olefins are ethylene, propylene, butylene, isobutylene, octylene, butadiene, and isoprene. Exemplary of methyltitanium halides are compounds such as methyltitanium trichloride, methyltitanium tribromide, methyltitanium triiodide, etc.

These methyltitanium halides are suitably prepared by mixing methylaluminum compounds such as trimethylaluminum, methylaluminum dihalide or dimethyl aluminum halide with a titanium tetrahalide at room temperature. They may be distilled from the reaction mixture under reduced pressure. Such a process is described in copending application Serial No. 627,545, filed December 11, 1956. The catalysts are particularly useful in a pure isolated form. Those catalysts prepared according to earlier known procedures contained small amounts or organoaluminum compounds. However, it is preferable to use in many cases catalysts which contain no appreciable amounts of organoaluminum compounds and which can be obtained by the preparation set forth herein.

The catalysts of the invention may be practically completely freed of the organoaluminum compounds contained in the catalyst by treating the catalyst or its solution with complex formers, such as sodium chloride and/or diphenyl ether or dibenzyl-ether, followed by vacuum distillation. The catalyst can be further purified by recrystallization if desired.

It is of advantage that ethylene can now be polymerized with a single catalyst, since in this way a better control of the polymerization is possible, and furthermore, the by-products which form when the other catalyst systems are used are avoided.

When the reaction of the invention is carried out at high temperatures, approximately in the range of 70–100° C., the polymerization starts slowly and can subsequently be continued at lower temperatures. When there is a drop in the reaction velocity, the reaction can be accelerated by adding, for example, another portion of methyltitanium trichloride.

When the reaction is induced at lower temperatures, about 50° C., it is recommended to use the catalyst of the invention in slightly higher concentrations than is customary. The catalyst concentration generally used at the beginning of the reaction is about 0.1–50 or preferably 2–8 mmoles of methyltitanium halide per liter of dispersing medium, and is maintained during the polymerization by continuous or portionswise addition. The catalyst is used by itself or dispersed in a dispersion medium set forth hereinafter or in solution in a solvent.

In the process of this invention the usual dispersing media used in the polymerization of ethylene such as saturated hydrocarbon fractions boiling in the range of 60–250° C., preferably 180–220° C., are used. Such dispersing media include pentane, hexane, cyclohexane and the like as well as mixtures and fractions boiling in this temperature range such as are obtained in the Fischer-Tropsch synthesis. Naturally other aliphatic hydrocarbons or aromatic hydrocarbons such as benzene, toluene, xylene, etc., or even halogen-containing hydrocarbons such as chlorobenzene, or methylene chloride, can be used as dispersing media.

The embodiment of the invention is illustrated in detail by the following examples.

*Example 1*

A four-necked flask of 1-liter capacity was charged with 500 cc. of an aliphatic, previously degassed, hydrocarbon having a boiling range of 180–220° C. and the contents were vigorously agitated for 30 minutes in a stream of ethylene. To the hydrocarbon was added 3.3 mmoles of methyltitanium trichloride dissolved in hexane. The yellow solution was heated to about 100° C. with a slightly slower passage of ethylene and continuous agitation. After a while, the solution turned dark and began to absorb ethylene at increasing rate. For the most part, insoluble polyethylene was formed. Cooling to room temperature decreased the rate of the absorption of ethylene. Even at room temperature, the absorption of ethylene can again be increased by adding more of the methyltitanium trichloride solution.

A polymerization batch, which after having been heated to 100° C. was cooled to 25–30° C. and allowed to stand at this temperature for a longer period, yielded about 80 g. of polyethylene having a reduced viscosity $\eta$ spec./c.=1.16 (measured in tetrahydronaphthalene at 120° C.).

*Example 2*

Five hundred cc. of an aliphatic hydrocarbon was pretreated as in Example 1. Twenty-five cc. of the solvent saturated with ethylene was removed from the polymerization vessel and mixed, with the exclusion of air (for example, in a Schlenck reactor), with 3 cc. of a haxane solution containing about 1 mmole of methyltitanium trichloride per cubic centimeter. The mixture remained at room temperature for 30 minutes during which time it turned deep brown.

The mixture was transferred to the polymerization vessel with the exclusion of air. At room temperature, the absorption of ethylene and the formation of polyethylene started instantaneously. The heat of reaction was removed by cooling and a reaction temperature of 30° C. maintained.

In case the absorption of ethylene subsides, the rate of polymerization can be regained by adding more methyltitanium trichloride. After 2½ hours, a yield of 60 g. of polyethylene having a reduced viscosity $\eta$ spec./c.=1.99 (measured in tetrahydronaphthalene at 120° C.) was obtained.

Example 3

500 cc. of an aliphatic hydrocarbon was pretreated as in Example 1. To the solvent was added 3.5 mmoles of methyltitaniumtrichloride dissolved in hexane. The stirred mixture was kept at a temperature of 80° C. After an induction period of 4 hours absorption of ethylene began. When the rate of absorption started to decrease, a 0.1 molar solution of methyltitaniumchloride was added at a rate sufficient to keep the rate of ethylene-absorption constant. In this way further 3 mmoles of methyltitanium trichloride were added within 3 hours. The polymerization was stopped by addition of 10 cm.$^3$ isopropanol. The polyethylene formed was filtered off, treated with 200 cm.$^3$ isopropanol at room temperature for the removal of the catalyst and dried.

Yield 101 g. Viscosity 0.78 ($\eta$ spec./c. measured in tetrahydronaphthalene at 120° C. in 0.5% solution).

This is a continuation-in-part of U.S. application Serial No. 627,546, filed December 11, 1956, now abandoned.

What is claimed is:

1. A process for the low-pressure polymerization of an alpha-olefin of 2 to 8 carbon atoms which comprises contacting said olefin in an organic dispersing agent at a temperature in the range of about 0° C. to about 300° C. with a catalyst consisting essentially of a methyltitanium trihalide.

2. The process of claim 1 in which the olefin is ethylene.

3. The process of claim 1 in which the olefin is propylene.

4. The process of claim 1 in which the methyltitanium trihalide is methyltitanium trichloride.

5. The process of polymerizing ethylene to a solid polymer which comprises contacting ethylene with a catalyst consisting essentially of a methyl titanium trihalide.

No references cited.